United States Patent [19]

Witte

[11] Patent Number: 4,825,505
[45] Date of Patent: May 2, 1989

[54] DETACHABLE HANDLE

[75] Inventor: Günter Witte, Attendorn, Fed. Rep. of Germany

[73] Assignee: Gebr. Dingerkus, Attendorn, Fed. Rep. of Germany

[21] Appl. No.: 86,725

[22] Filed: Aug. 17, 1987

[30] Foreign Application Priority Data

Aug. 21, 1986 [DE] Fed. Rep. of Germany ....... 3628438

[51] Int. Cl.$^4$ ............................................. A47B 95/02
[52] U.S. Cl. .................. 16/114 A; 16/110 A
[58] Field of Search ............ 16/114 A, 110 A, 114 R, 16/DIG. 24; 220/94 R

[56] References Cited

U.S. PATENT DOCUMENTS

| 3,956,792 | 5/1976 | Fischbach | 16/114 A |
| 4,083,081 | 4/1978 | Witte | 16/114 A |

FOREIGN PATENT DOCUMENTS

| 2019571 | 11/1971 | Fed. Rep. of Germany. | |
| 2528149 | 1/1976 | Fed. Rep. of Germany | 16/110 A |
| 2501404 | 7/1976 | Fed. Rep. of Germany | 16/110 A |
| 2553308 | 6/1977 | Fed. Rep. of Germany. | |
| 3627229 | 5/1987 | Fed. Rep. of Germany | 16/114 A |

Primary Examiner—Nicholas P. Godici
Assistant Examiner—Carmine Cuda
Attorney, Agent, or Firm—Herbert Dubno

[57] ABSTRACT

To construct a detachable handle for a pot or container so that it is both slender and short, the pot or container handle is mountable on a supporting member of the container having two side pieces oriented in the same direction extending from the container and is engageable and lockable by a retaining member secured behind inclined projections on said supporting member and slidably supported parallel to the container wall between handle shoulders located transverse to the attaching direction of the handle. The retaining member of the handle can be a rigid bar which is associated with a spring element, has a flame protector surrounding the handle contacting portion and is inserted in lateral grooves opening to the container front side and running along both long sides on the container side handle end portion. The supporting member side pieces can also each be inserted in each of the lateral grooves. The spring element acting to secure the retaining member can be a leg spring inserted in a cavity between the lateral grooves braced with one spring leg on the bar to secure it and with the other spring leg held in place in the handle. The lateral grooves for the side pieces are covered exteriorly by the flame protector.

12 Claims, 2 Drawing Sheets

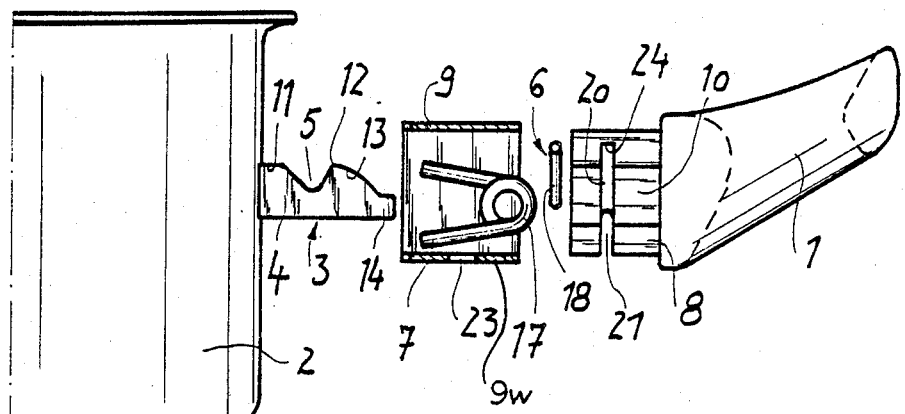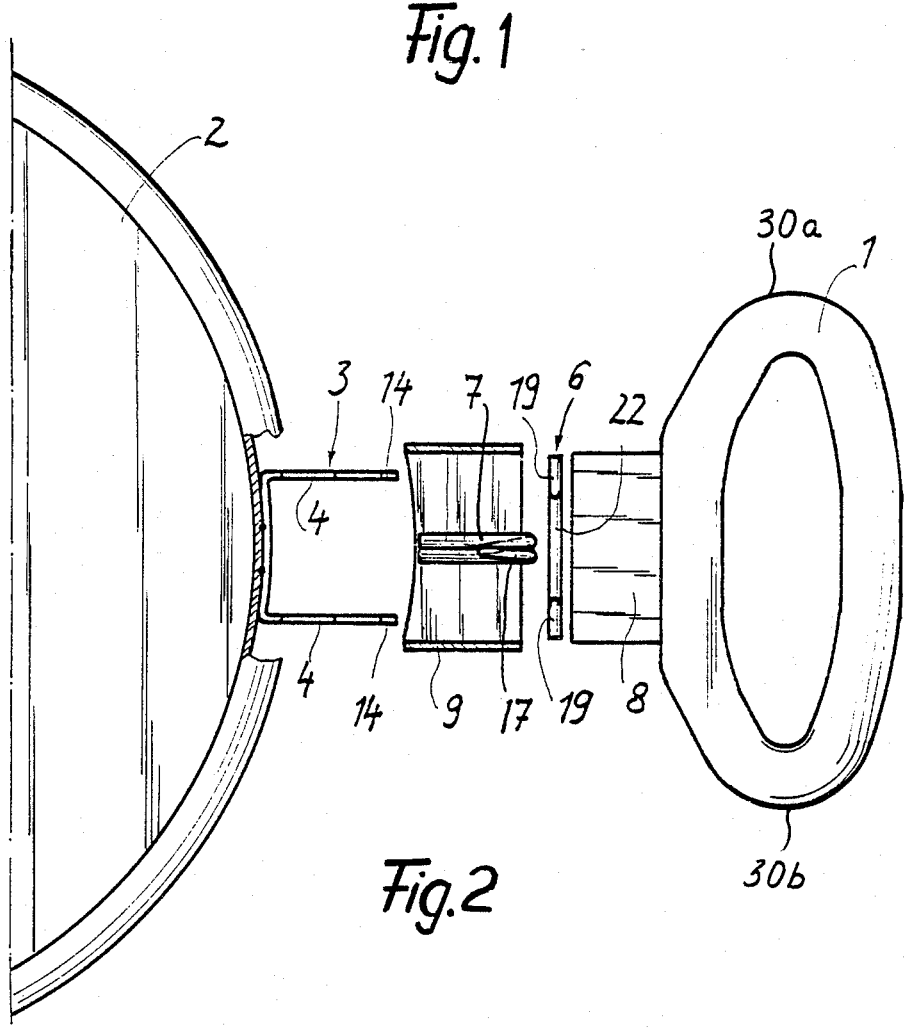

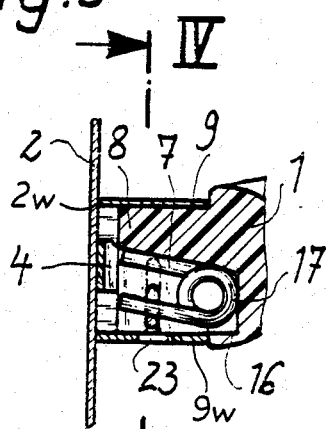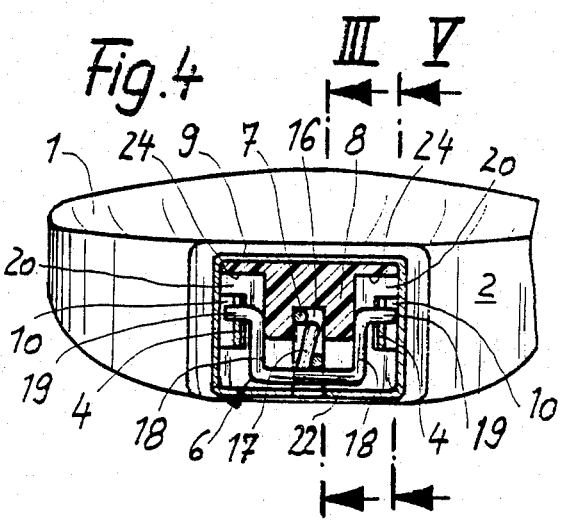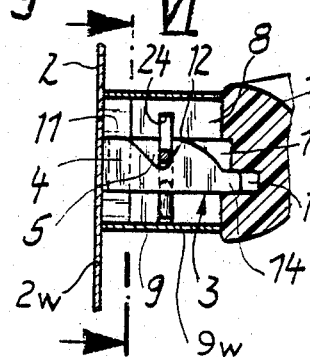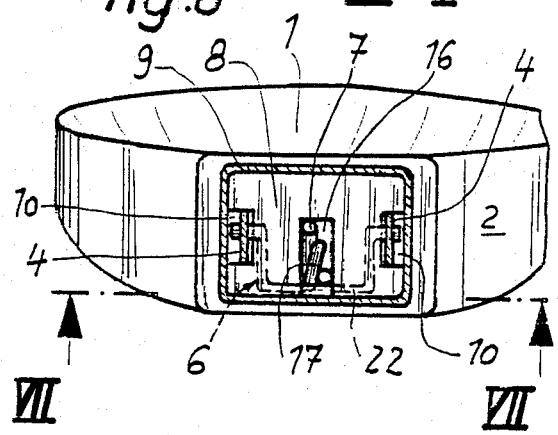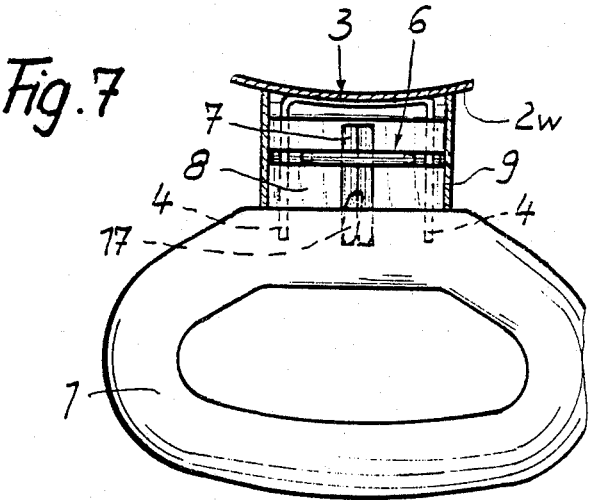

DETACHABLE HANDLE

FIELD OF THE INVENTION

My present invention relates to a handle for a container and, more particularly, to a detachable handle for a pot or like container. The invention relates, more specifically, to a handle, especially made of plastic synthetic resin, for a container, such as a pot, which can be affixed on a supporting member extending from the wall of the pot or container having two side pieces identically oriented and is lockable by a retaining member secured behind inclined supporting member projections and is slidably supported substantially parallel to the wall of the container or pot between handle shoulders positioned transverse to the mounting direction of the handle.

The retaining member can be a rigid bar which is associated with a compressible spring element.

The handle can have a sleeve-like flame protector surrounding the container or pot side end portion of the handle at least over a portion of its periphery.

BACKGROUND OF THE INVENTION

A handle for a pot or container is described in German Patent No. 20 19 571 which has at least one nearly linear flexible bar for mounting the handle perpendicularly whose end portions engage behind handle shoulders and are bent away elastically on insertion of the handle on the supporting member.

The flexible bar is supported centrally in a block or supporting member in the handle. Ends of the bar slide on the front sides of the supporting member projections and thus are bent downwardly in the handle slot and contact on the rear sides of the supporting member projections after passing the spring peak point.

This handle requires a comparatively long flexible bar to maintain the largest possible spring displacement so that large tolerances can be overcome in connection with the rearwardly inclined sides of the supporting member projections.

Moreover, the end portion of the handle facing the pot must be constructed to be comparatively wide. Inasmuch as the handle is made of plastic, a flame protector made of metal is provided which must also be comparatively large. Its manufacturing cost amounts to about 50% of that of the entire handle.

To keep the structure of the steel handle for the pot or container slender as taught in German Patent No. 25 53 308, a retaining member is formed as a rigid bar. This bar is provided with an elongated compressible bending spring pressing on the bar running approximately parallel to the longitudinal extent of the steel handle in a cavity extending longitudinally in the handle. The bent spring is located with only its front end or spring leg in a conforming mounting opening in the handle cavity and with its free spring end or leg engaged on the bar.

This handle attachment is, however, usable only for a steel handle because of the required comparatively deep handle cavity designed for receipt of the supporting member and the bent spring.

OBJECTS OF THE INVENTION

It is an object of my invention to provide an improved handle for a container, such as a pot or the like, which will be free from the aforementioned drawbacks.

It is also an object of my invention to provide an improved detachable handle for a container, pot or the like.

It is another object of my invention to provide an improved, advantageously detachable, handle for a pot, container or the like having both a short and a slender form for the pot side handle end portion necessary for attachment with the handle thereby affording high structural stability and reduced manufacturing and storage cost.

SUMMARY OF THE INVENTION

These objects and others which will become more readily apparent hereinafter are attained in accordance with my invention in a handle, especially made of plastic, for a container, such as a pot or the like, which is mountable on a supporting member extending from the wall of the pot having two side pieces identically oriented and is lockable by a retaining member locked in behind fixed inclined supporting member projections and is slidably supported substantially parallel to the wall of the container or top between handle shoulders positioned transverse to the mounting direction of the handle, the retaining member being a rigid bar which is associated with a compressible spring element, and which has a sleevelike flame protector surrounding the container or pot side end portion of the handle at least over a portion of its periphery.

According to my invention a lateral groove is provided in the pot side end portion of the handle opening on the pot front side of the handle opening on each longitudinal side of the end portion, each of the side pieces of the supporting member is insertable in each of the lateral grooves and the spring element is formed as a substantially U-shape two-shank spring which is insertable in a central cavity positioned about equidistant between the lateral grooves and oriented substantially identically with respect to each of the lateral grooves and supports itself with one linear end piece of the spring and grips with the other one of the linear end pieces. Advantageously the outer sides of the lateral grooves are covered by a flame protector. Also advantageously the shank spring is directed with its free ends toward the container or pot.

My invention provides a handle base member which is both more slender and also shorter for attachment of the handle to the container or the pot. This handle form is usable for all kinds of handles such as steel handles, circular handles or both vertically and horizontally attached handles as well as handles for pots of all different conventional handle diameters. Therefore only one handle type including a flame protector need be made and stored.

A comparatively smaller handle results because of the comparatively slender form. Consequently, in contrast to what was done before my invention, a considerably less expensive flame protective sleeve results as well as other economies.

Moreover, because of the supporting member side pieces engaging in the longitudinal sides of the handle, the spacing of the supporting member side pieces is as large as possible which guarantees a highly reliable nonrotatable attachment of the handle to the container or pot. Also a comparatively larger displacement of the spring element acting on the bar can still be retained.

An additional increase in the stability or reliability of my invention is attained when the supporting member side pieces fit in the lateral grooves and are profiled corresponding to the cross section of the lateral grooves at least at two positions spaced behind each other on each of the side pieces. Between these positions is provided an indexing or positioning notch cooperating or working together with the bar. The supporting member side pieces can have end portions which are each inserted without substantial play in recesses open toward the pot provided in the handle.

Advantageously the central cavity positioned in the handle and designed for receiving the shank spring is open to the flame protector and the bar can contact the interior side of flame protector. Furthermore, advantageously the bar can contact the interior side of the flame protector under a positively applied force by the shank spring.

An especially desirable form for the bar and its arrangement in the handle can be attained when the bar which is bent is provided with two linear end pieces coaxial to each other and directed in opposite directions from each other projecting into the lateral grooves designed for receiving the supporting member side pieces. Also the bar legs are guided longitudinally slidable in bar leg grooves running transversely to the mounting direction of the handle provided in the handle and a cross piece of the bar connected to the bar legs is received in another transverse groove of the handle. The shank spring is advantageously centered on the cross piece of the bar.

A reliable parallel guiding of the bar, which has up to now not been attained, results in the satisfactorily correct and reliable attachment of the handle to the container or pot. The handle end pieces can be dimensioned to be less massive than when a straight or linear bar is used because the bent bar and the grooves formed corresponding to the bar are of reduced width.

It is advantageous for the bar leg grooves and transverse groove receiving the bar to be provided adjacent the container or pot side of the handle.

It is also advantageous for a hole for insertion of a push rod to be provided opposite the center of the cross piece of the bar in the lower wall of the flame protector.

This has the advantage that the release of the handle mounted on the container can be assisted by a tool while further care is taken not to clog the hole in the flame protector with dirt or the like.

At least one limiting stop in each of the bar leg grooves can be provided cooperating with the linear end pieces bent in the bar. The limiting stops are equally spaced from the lateral grooves for receiving the supporting member side pieces.

Based on the foregoing arrangement, both end pieces of the bar can be disengaged when, for example, because of manufacturing tolerances the bar itself is askew as a result of the inward thrust of the push rod. Then the bar is automatically aligned in the correct position by the limiting stops.

To increase the spring displacement of the shank spring it is required that at least one circular coil be provided on the bend of the spring (in accordance with the principles of a torsion spring).

The retaining member by definition is that part of the handle which when engaged acts to hold or keep the handle on the pot.

BRIEF DESCRIPTION OF THE DRAWING

The above and other objects, features and advantages of my invention will become more readily apparent from the following description, reference being made to the accompanying highly diagrammatic drawing in which:

FIG. 1 is an exploded partially cutaway side elevational view of a pot with a handle according to my invention;

FIG. 2 is a partially exploded top view of the handle and pot of FIG. 1;

FIG. 3 is a cross sectional view through the attached handle of FIG. 4 taken along the section line III—III thereof;

FIG. 4 is a partially front elevational, partially cross sectional view through the attached handle taken along the section line IV—IV of FIG. 3;

FIG. 5 is a cross sectional view through the handle of taken along the line V—V of FIG. 4;

FIG. 6 is a partially front elevational, partially cross sectional view through the handle taken along the section line VI—VI of FIG. 5; and FIG. 7 is a cross sectional view of the attached handle of FIG. 4 taken along the sectional line VII—VII of FIG. 6.

SPECIFIC DESCRIPTION

For attachment of a substantially circular plastic handle 1 to a pot 2 a metal U shape supporting member 3 extending from the pot 2, is provided with a notch 5 in each of its two side pieces 4, a rigid steel bar or bolt 6 lockable in the notch 5, a spring element which in this case is shank spring 7 acting on the bar 6 and a sleeve-like flame protector 9 mounted on the pot side end portion 8 of the handle 1. All parts are illustrated in the drawing in a scale 1:1.

The radially extending end portion 8 of the circular shaped part of the handle 1 has a substantially rectangular cross section. The long side of this cross section runs parallel to the mouth of the pot 2. The length of the handle end portion 8 corresponds in this example to half the length of the long side of the handle 1.

A laterally open lateral groove 10 is formed on each longitudinal side of the handle end portion 8 in which groove according to FIGS. 3 to 7 a side piece 4 is insertable and linearly guided. The side pieces 4 support the handle 1 at two positions 11 and 12 spaced from each other on their top sides and over its entire length on the bottom side and are insertable in the lateral grooves 10 nearly without play.

One notch 5 is provided between the positions 11 and 12 on each side piece 4. An inclined mounting ramp 13 projecting in the direction of the free end of each side piece 4 is adjacent the position 12. In turn, ramp 13 is connected with an end portion 14 with longitudinal sides parallel to each other.

These end portions 14 of the side pieces 4 are insertable in open recesses 15 provided in the handle 8. Recesses 15 face toward the container or pot 2. When inserted, the end portions 14 sit in the recesses 15 with almost no play.

An additional cavity 16 is provided in the handle end portion 8. Cavity 16 is open on top and positioned centrally between the lateral grooves 10 approximately equidistant from them. The shank spring 7 is provided in cavity 16 inserted under compression so that its leg end portions are aimed toward the pot 2 or container 2.

The cavity 16 is formed open at the bottom of the handle end portion 8. The shank spring 7 has one coil 17 in the vicinity of its bend. The bar 6 formed from a circular rod segment has a substantially bent shape and has linear end pieces 19 bent in opposite directions from the bar legs 18 of the bar 6 and positioned coaxial to each other for engagement in the notches 5 of the side pieces 4.

Each of the bar legs 18 is bounded slidably longitudinally in a bar leg groove 20 perpendicular to the insertion direction of the handle 1 which extends over one side of the handle end portion 8. The bar leg grooves 20 connect to and extend into a common transverse groove 21 of the handle end portion 8 oriented perpendicularly to the bar leg grooves 20 in which a crosspiece 22 of the bar 6 is guided. Thus, bar 6 lies substantially parallel to the wall of container 2 between handle shoulders 30a and 30b and transverse to the mounting direction of handle 1.

The one spring leg of the shank spring 7 supports itself in the recess 16 while the other spring leg of the shank spring contacts under compression the crosspiece 22 of the bar 6 so the crosspiece 22 is forced against the inner side of the sleevelike flame protector 9 frictionally fitting therein before insertion of the handle 1 on the supporting member 3 and thus holds the inserted flame protector 9 fixed on the handle end portion 8.

The center of the crosspiece 22 of the bar 6 is positioned opposite a hole 23 in the lower wall 9w of the flame protector 9 through which a push rod like tool which has not been shown can be inserted for release of the handle 1 from the container or pot 1. This tool pushes the bar against the force of the shank spring 7 to the upper side of the handle end portion 8 and releases the bar end pieces 19 from the notches 5.

Should the bar 6 be tilted, the limiting stops 4 provided in the bar leg grooves 20 guarantee that the bar 6 is aligned in the correct position positively actuated by support of the bar end pieces 19 on the limiting stops 24.

The positions or locations 11 and 12 on the supporting member side pieces 4 are in this example supporting member projections. Generally speaking the supporting member projections are projections on the supporting member which are used to engage the retaining member.

In this example the retaining member is the bar 6.

I claim:

1. In a handle, especially made of plastic, for a container such as a pot or the like, which handle is mountable on a supporting member extending from a wall of said pot having two side pieces identically oriented, which handle is lockable through a retaining member that is clampable behind inclined projections on said supporting member and slidably supported substantially parallel to said wall of said container or top between handle shoulders positioned transverse to the mounting direction of said handle, said retaining member being a rigid bar which is associated with a compressible spring element and which has a sleevelike flame protector surrounding the container or pot side end portion of said handle at least over a portion of its periphery, the improvement wherein a lateral groove is provided in said pot side of said handle open on each longitudinal side of said end portion, each of said side pieces of said supporting member being insertable in each of said lateral grooves and said spring element being a substantially U-shape shank spring having two spring legs and which is insertable in a central cavity positioned about equidistant between said lateral grooves and oriented substantially identically with respect to each of said lateral grooves and said spring supports itself with one of said spring legs and grips with the other one of said spring legs.

2. The improvement according to claim 1 wherein the outside of said lateral grooves are covered by said flame protector.

3. The improvement according to claim 1 wherein the free ends of said shank spring are directed toward said container or pot.

4. The improvement according to claim 1 wherein said side pieces are engaged to fit into said lateral grooves and profiled corresponding to the cross section of said lateral grooves at least at two positions spaced behind each other on said side pieces corresponding to said supporting member projections and between said positions is provided a notch cooperating or working together with said bar.

5. The improvement according to claim 4 wherein said side pieces have side piece end portions which are inserted in recesses provided in said handle opening toward said container or pot without substantial play.

6. The improvement according to claim 1 wherein said central cavity positioned in said handle and designed for receiving said shank spring is open to said flame protector and said bar can contact the interior side of said flame protector under a positively applied force by said shank spring.

7. The improvement according to claim 1 wherein said bar is bent into a pair of bar legs, which legs are each provided with a linear end piece coaxial to the other end piece and directed in opposite directions from one another projecting into said lateral grooves designed for receiving said supporting member side pieces, each of said bar legs of said bar being guided longitudinally slidable in one of two bar leg grooves running transversely to the mounting direction of said handle provided in said handle and a crosspiece of said bar connected to said bar legs being received in another transverse groove of said handle and said shank spring is positioned centered on said crosspiece of said bar.

8. The improvement according to claim 7 wherein said bar leg grooves and said transverse groove receiving said bar are provided adjacent said pot side of said handle.

9. The improvement according to claim 7 wherein a hole for insertion of a push rod is provided opposite the center of said crosspiece of said bar in a lower wall of said flame protector.

10. The improvement according to claim 9 wherein at least one limiting stop in each of said bar leg grooves is provided cooperating with said linear end pieces bent in said bar, said limiting stops being equally spaced from said lateral grooves for receiving said supporting member side pieces.

11. The improvement according to claim 1 wherein said shank spring has at least one circular coil provided at the bend of said shank spring.

12. A detachable handle for a pot comprises:
a supporting member for said handle attached to said container or pot having two side pieces oriented in the same direction extending from a wall of said container or pot;
a retaining member engagable and lockable behind a plurality of inclined projections on said supporting member of said side pieces slidably supported parallel to said wall of said container provided transverse to the attaching direction of said handle, said retaining member of said handle being a rigid bar, which is bent into a pair of bar legs, which legs are each provided with a linear end piece coaxial to the other end piece and directed in opposite directions from one another projecting into two lateral grooves designed for receiving said side pieces, each of said two bar legs of said bar being guided longitudinally slidable in one of two bar leg grooves running transversely to the mounting direction of said handle provided in said handle and a crosspiece of said bar connected to said bar legs being received in another transverse groove of said handle and said shank spring is positioned centered on said crosspiece of said bar;

a compressible spring element which is associated with said retaining member which protrudes in said lateral grooves opening to a front side of said container and running along both longitudinal sides in the container or pot side handle end portion, said spring element acting to secure said retaining member being a U-shape shank spring having at least one coil inserted in a cavity between said lateral grooves braced with one spring leg on said bar and with the other of said spring legs held in place in said handle; and a flame protector covering at least a portion of the periphery of said end portion of said handle having a hole opposite the center of said crosspiece of said bar in a lower wall of said flame protector for insertion of a push rod.

* * * * *